US009449246B1

(12) United States Patent
van Baar et al.

(10) Patent No.: US 9,449,246 B1
(45) Date of Patent: Sep. 20, 2016

(54) METHOD FOR DEFORMABLE IMAGE REGISTRATION

(71) Applicant: Mitsubishi Electric Research Laboratories, Inc., Cambridge, MA (US)

(72) Inventors: Jeroen van Baar, Arlington, MA (US); Dohyung Seo, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/711,897

(22) Filed: May 14, 2015

(51) Int. Cl.
*G06K 9/00* (2006.01)
*G06K 9/46* (2006.01)
*G06T 7/00* (2006.01)
*G06K 9/62* (2006.01)

(52) U.S. Cl.
CPC .............. *G06K 9/4604* (2013.01); *G06K 9/46* (2013.01); *G06K 9/6201* (2013.01); *G06T 7/0012* (2013.01); *G06K 2009/4666* (2013.01)

(58) Field of Classification Search
USPC ......................................................... 382/128
See application file for complete search history.

(56) References Cited

U.S. PATENT DOCUMENTS

| 7,925,089 B2 | 4/2011 | Rother et al. |
| 8,009,886 B2 | 8/2011 | Li et al. |
| 8,023,732 B2 | 9/2011 | Deuerling-Zheng et al. |
| 8,478,034 B2 | 7/2013 | Chang et al. |
| 8,533,139 B2 | 9/2013 | Jamriska et al. |
| 8,970,619 B2 | 3/2015 | Lepikhin |
| 2008/0095465 A1* | 4/2008 | Mullick ............... G06K 9/6206 382/284 |
| 2012/0155136 A1 | 6/2012 | Von Novak et al. |
| 2013/0089249 A1* | 4/2013 | Mueller ................ G06T 3/0068 382/128 |

OTHER PUBLICATIONS

Adrien Bartoli, "Image Registration Image Registration 2D, 3D, Rigid and Deformable Scenes", 2008, CNRS—LASMEA Clermont Clermont-Ferrand, France, Retrieved from Internet on May 21, 2016, from URL:<http://isit.u-clermont1.fr/~ab/Classes/VIPS-IR/Handouts/Lecture2p02.pdf>.*

Tang, T.W.H., Chung, A.C.S.: Non-rigid image registration using graph-cuts. In: Proceedings of MICCAI. pp. 916-924 (2007).

Strandmark, P. and Kahl, F.: Parallel and distributed graph cuts by dual decomposition. In IEEE Computer Vision and Pattern Recognition (CVPR) (Jun. 2010).

Boykov, Y., Kolmogorov, V.: An experimental comparison of min-cut/max-flow algorithms for energy minimization in vision. IEEE Pattern Analysis and Machine Intelligence 26(9) (Sep. 2004).

(Continued)

*Primary Examiner* — Gregory F Cunningham
(74) *Attorney, Agent, or Firm* — Gene Vinokur; James McAleenan; Hironori Tsukamoto

(57) ABSTRACT

A method registers a deformable image to a fixed image by first acquiring the deformable image and the fixed image. Multi-resolution multi-level image pyramids are generated for the deformable and fixed images. Levels of the multi-resolution multi-level image pyramids are processed in a coarse to fine order, and for each deformable and fixed image at each level partitioning the deformable and fixed image into overlapping blocks, and labeling each block with a label by solving, iteratively and in parallel, until a termination condition is reached, a binary maximum flow problem, within α-expansion, for each block and performing boundary fusion for the blocks, and then registering each block according to the labels to form the fixed image.

10 Claims, 4 Drawing Sheets

(56) References Cited

OTHER PUBLICATIONS

Kolmogorov, V., Rother, C.: Minimizing nonsubmodular functions with graph cuts—a review. IEEE Pattern Analysis and Machine Intelligence 29(7) (Jul. 2007).

Lempitsky, V., Rother, C., Roth, S., Blake, A.: Fusion moves for markov random field optimization. Tech. Rep. MSR-TR-2009-60 (May 2009).

Seo, D., van Baar, J.: Deformable registration with discontinuity preservation using multi-scale mrf. In: Proceedings of MICCAI{Workshop on Image-Guided Adaptive Radiation Therapy (2014).

Liu et al., "Parallel graph-cuts by adaptive bottom-up merging," IEEE Computer Vision and Pattern Recognition (CVPR) (Jun. 2010).

\* cited by examiner

Algorithm 1 Parallel Multi-Scale Graph Cuts

1: procedure FINDLABELING
2:    out: $L$ - Labeling.
3:    var: $I_i$ - Image pyramid level.
4:    var: $l_{i,l}$ - Label level at image level $I_i$.
5:    var: $\alpha$ - $\alpha$-expansion iteration.
6:    for $I_i; i = [1, n]$ do
7:      for $l_{i,l}; l = [1, m]$ do
8:        for $\alpha = [1, k]$ do
9:          BINARYMAXFLOWPARALLEL
10:         BOUNDARYFUSIONPARALLEL
11:        end for
12:      end for
13:    end for
14:    return $L$
15: end procedure

FIG. 4

METHOD FOR DEFORMABLE IMAGE REGISTRATION

FIELD OF THE INVENTION

This invention relates generally to image registration, and more particularly to deformable image registration.

BACKGROUND OF THE INVENTION

In many medical imaging applications, such as image-guided radiotherapy, adaptive radiation therapy, magnetic resonance imaging (MRI), and computer axial tomography (CAT), deformable image registration (DIR) is a challenge for images of organs and soft tissue. Discontinuous deformations occur at organ and tissue boundaries. For example, in the case of respiratory motion, a discontinuous deformation occurs along the boundary between the lungs and surrounding tissue.

Prior art methods for DIR registration generally assume that the underlying deformations are inherently smooth. Therefore, those methods cannot account for discontinuities. To circumvent the discontinuity problem, one method segments each organ and perform registration on each organ independently and separately. However, that requires accurate segmentation as a preprocessing step, which is not an easy task for medical images, particularly if the organs and tissue are intertwined.

Discontinuities in the underlying deformations can be preserved by using a discrete optimization approach, where deformation vectors are represented with a set of labeled vectors, see e.g., Seo and van Baar, "Deformable registration with discontinuity preservation using multi-scale MRF," Proceedings of Workshop on Image-Guided Adaptive Radiation Therapy, 2014.

A drawback of formulating the deformable registration as a labeling problem, is that many labels are required to accurately approximate the underlying deformations. Thus, discontinuity preserving approaches require longer optimization time, compared to, for example, methods that use dense image registration such as (diffeomorphic) demons, or B-splines.

DIR can be classified into continuous and discrete methods. Continuous methods assume a smooth underlying deformation field, while discrete methods explicitly handle discontinuities in the deformation field. Determining accurate deformation vectors requires a large label set, which results in increased computational time and memory.

Parallelization of graph cuts can improve the computational speed of the DIR. In a parallel approach, parts of the solution are computed in parallel and then combined into a single solution.

Parallelized graph cuts have been applied in a region-based push-relabel approach, see Boykov et al., "An experimental comparison of min-cut/max-flow algorithms for energy minimization in vision," IEEE Pattern Analysis and Machine Intelligence 26(9), September, 2004. By redefining relabeling heuristics on the regions, rather than globally, they achieve both locality and parallelism. The boundary nodes of a region are considered constant, to maintain a global consistency of the graph.

Another method uses a two phase parallel scheme, see Liu et al., "Parallel graph-cuts by adaptive bottom-up merging," IEEE Computer Vision and Pattern Recognition (CVPR), June, 2010. In a first phase the graph is partitioned into subgraphs, and augmented paths for the subgraphs are determined in parallel. In a second phase, the subgraphs are adaptively fused by restoring capacities between boundary nodes of two blocks. This merging yields longer augmented paths, and eventually finding a global optimum.

Another method uses splits the graph, with some overlap, and subsequently distributes across multiple computers, see Strandmark et al., "Parallel and distributed graph cuts by dual decomposition, IEEE Computer Vision and Pattern Recognition (CVPR), June, 2010. That method formulates a dual decomposition to solve a binary labeling problem with consistent labels for the nodes in overlapping region.

SUMMARY OF THE INVENTION

The embodiments of the invention provide a method for deformable image registration (DIR). The method uses discrete optimization to obtain a solution that accurately reconstructs discontinuities in a deformation field. Given the typical size of 3D medical images, even with efficient algorithms such as graph cuts, the processing time for discrete optimization can be excessively long. To increase performance, we use a multi-resolution strategy.

We partition an image into blocks, 2D blocks or 3D subvolumes. The registration problem for the blocks are solved separately and in parallel, providing the opportunity for significant speed-up on hardware including many processors. One problem is inconsistent solutions along the boundaries of blocks when the blocks are partitioned.

To ensure consistency along block boundaries, a number of candidate solutions in a small region around each boundary are fused. The results on partitioned images achieve similar accuracy as in the non-partitioned case, including discontinuity preserving deformations.

BRIEF DESCRIPTION OF THE DRAWINGS

FIG. 4 is a block diagram of pseudocode for labeling nodes in a graph.

DETAILED DESCRIPTION OF THE PREFERRED EMBODIMENTS

Figure 1:
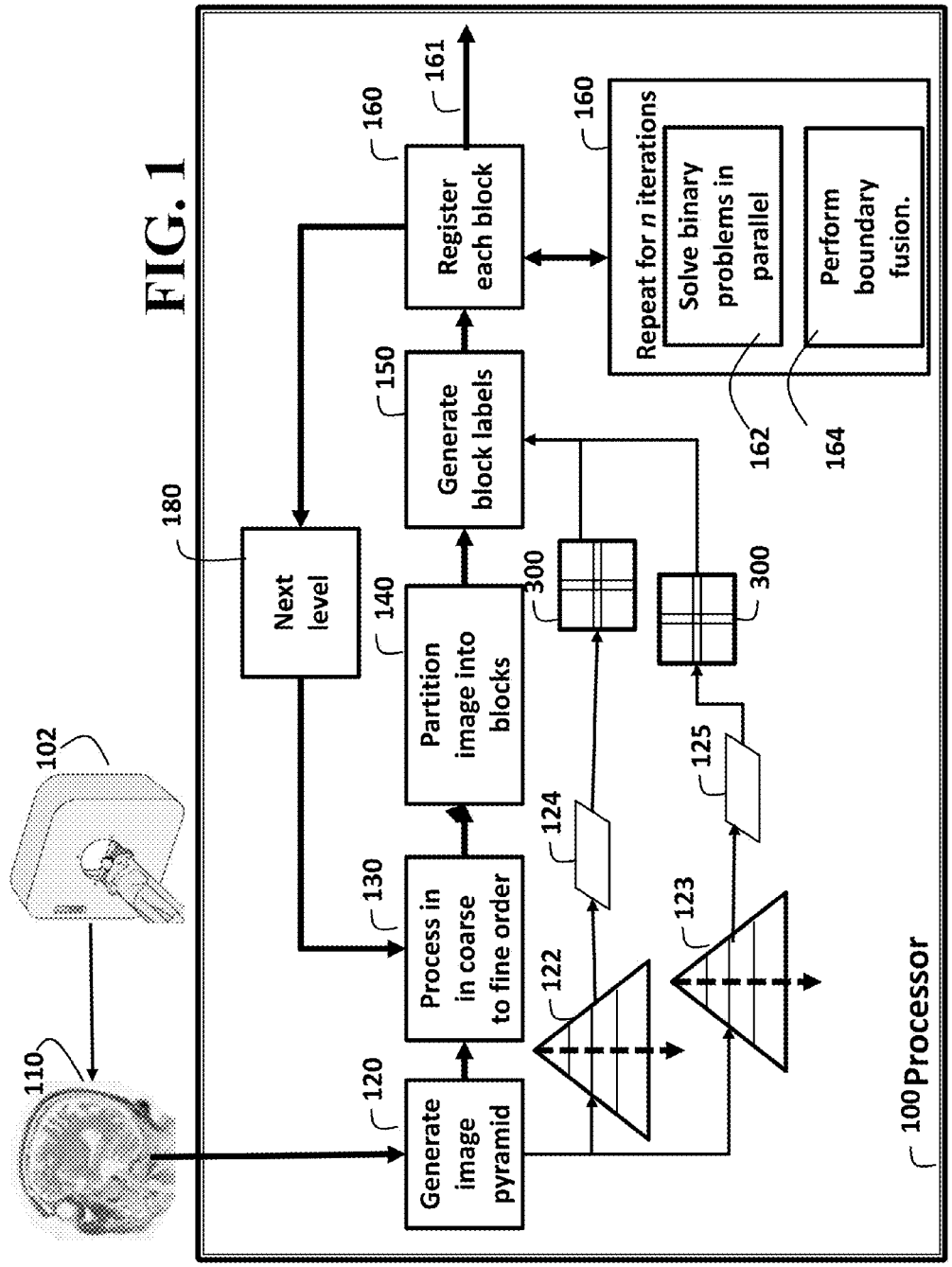
FIG. 1 is a block diagram of a method for registering deformable images.

As shown in FIG. 1, the embodiments of our invention provide a method for registering deformable images 110. The images 110 can be acquired by a medical imaging system 102. The images can be two-dimensional (2D) or three dimensional (3D) images. The registration is between a pair of images, i.e., a deformable image X 110 registered to a fixed image Y 161. The pair of images are registered when for each pixel x in the N-dimensional image domain $\Omega^N$ of X, an anatomically correct correspondence in Y is known.

We generate 120 multi-resolution image pyramids 122-123 for the fixed and deformable images respectively, and process 130 the fixed and deformable images for 124-125 for the levels in the pyramid in a coarse 130 to fine order of the levels in the pyramid. Each fixed and deformable image in the current level is partitioned 140 into blocks 300, and we generate 150 labels, starting with blocks at the coarsest level.

Then, we register 160 each block at the current level, select 180 the next level and repeat until all blocks at all levels are registered.

The registering 160 solves binary problems in parallel 162, and performs boundary fusion 164 for n iterations as described below in detail.

The steps of the method can be performed in multiple processors 100 connected to memory and input/output interfaces by buses as known in the art. The method essentially transforms deformable images of, e.g., a patient, to fixed images.

For a registered pair of images, there exists a deformation vector field T: $u \in \mathbb{R}^N$. Because we emphasize discontinuity preservation, we base our method on a method described by Seo and van Baar, "Deformable registration with discontinuity preservation using multi-scale MRF, "Proceedings of Workshop on Image-Guided Adaptive Radiation Therapy," 2014.

Figure 2:
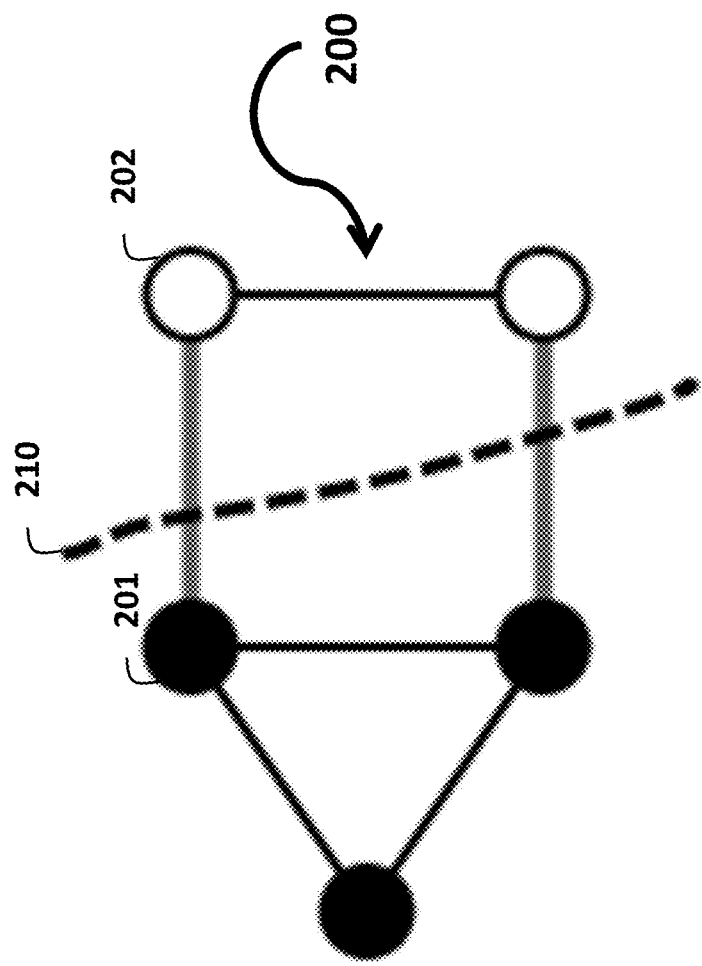
FIG. 2 is a schematic of a graph cut used by embodiments of the invention.

As shown in FIG. 2, the method formulate the DIR as a labeling problem and solve the problem using multi-scale graph cuts. In graph theory, a cut 210 is a partition of vertices of a graph 200 into two disjoint subsets, shown as black and white vertices 201-202. Any cut determines a cut-set, the set of edges that have one endpoint in each subset of the partition. These edges are said to cross the cut. In a connected graph, each cut-set determines a unique cut, and in some cases, cuts are identified with their cut-sets rather than with their vertex partitions.

An multi-level image pyramid has n levels. For each image level $l_i$, m coarse-to-fine labels are generated 150. The final labeling obtained at the highest (finest) image and label resolution corresponds to the deformation vector field. Because sub-pixel deformations require a large number of labels, even a multi-scale approach is computationally intensive.

Figure 3:
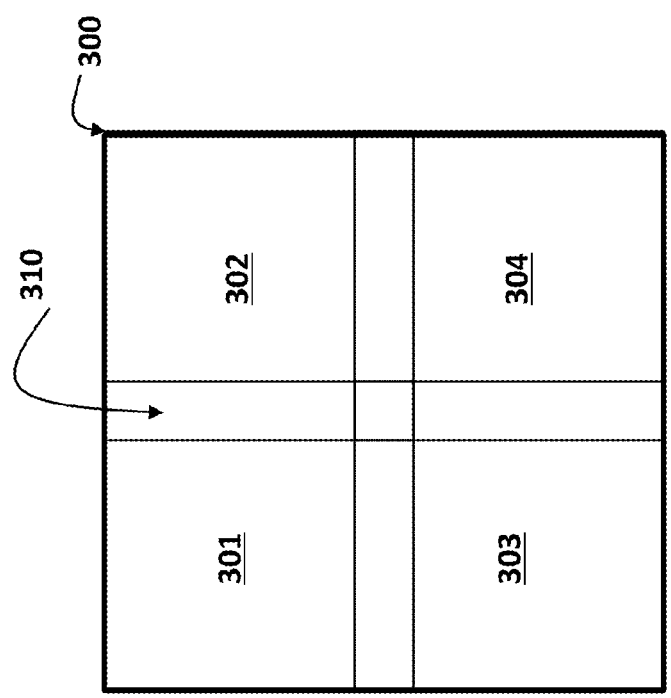
FIG. 3 is schematic of an image partitioned into overlapping block according to embodiments of the invention.

As shown in FIG. 3, we partitioned a 2D image 110 into, e.g., 2×2 blocks 301-304 (300). It should be understood that other partition sizes can also be used, e.g., 20×20, or 10×10×10. Each block overlaps its neighbor blocks by some amount. The blocks 301-304 consist of sets of nodes, thus nodes representing overlapping regions, e.g., 310 are assigned to more than one block.

Parallel Multi-ScaleGraph Cuts

FIG. 4 shows pseudo code for a procedure for labeling the nodes. In a call to BinaryMaxFlow-Parallel in step 9 (162), binary maximum flow problems within an α-expansion is solved at step 5 for all blocks in parallel using quadratic pseudo-boolean optimization (QPBO), see Kolmogorov et al., "Minimizing nonsubmodular functions with graph cuts—a review," IEEE Pattern Analysis and Machine Intelligence 29(7), July 2007. The main idea of the alpha-expansion is to successively segment all α and non-α pixels with graph cuts, and changing the value of α at each iteration. The procedure iterates through each possible label for α until a termination condition is reached, which can be convergence, or a predetermined number of iterations.

Because nodes representing an overlap region are assigned to multiple blocks, those nodes likely yield a different label for each block. This can introduce incorrect discontinuities along the boundaries. To ensure that we do not introduce any incorrect discontinuities along the boundary, we resolve the solution obtained per block, along the boundaries.

In the call to BoundaryFusionParallel in step 10 (164), we perform a fusion step, see Lempitsky et al., "Fusion moves for Markov random field optimization," Tech. Rep. MSR-TR-2009-60, May, 2009, of the different solutions obtained for nodes in the overlap region. We set up a fusion problem, where each node can either take the label from one of the blocks, or a new label. Because the overlap regions contain a small number of nodes, we can solve the fusion problems efficiently. Furthermore, we perform the fusion steps in parallel. For the example, the horizontal boundary and vertical boundary are solved in parallel. An optional final fusion step can resolve the overlap region between all four blocks.

Block Size

The number of blocks increases as the block size decreases, and the accuracy of the solution decreases proportionaly. This puts an upper bound on the number of blocks, and thus on the speed-up factor. However, we can still partition to a relatively large number of blocks. For example performing registration for a 3D image partitioned into 10×10×10 blocks, gains a dramatic performance increase on a sufficiently large computing cluster.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for registering a deformable image to a fixed image, comprising steps:
    acquiring the deformable image;
    acquiring the fixed image;
    generating a multi-resolution multi-level image pyramid for the deformable image;
    generating a multi-resolution multi-level image pyramid for the fixed image;
    processing levels of the multi-resolution multi-level image pyramids in a coarse to fine order, and for each deformable image at each level, and for each fixed image at each level:
    partitioning the deformable image into overlapping blocks;
    labeling each block with a label, wherein the labeling for each block further comprises:
        solving, iteratively and in parallel until a termination condition is reached, a binary maximum flow problem within α-expansion for each block and performing boundary fusion for the blocks;
        registering each block according to the labels to form the fixed image, wherein the steps are performed in multiple processors.

2. The method of claim 1, wherein the images are two-dimensional or three-dimensional images.

3. The method of claim 1, wherein the images are medical images.

4. The method of claim 1, wherein the labeling is solved for a predetermined number of iterations.

5. The method of claim 1, wherein the labeling is solved until convergence.

6. The method of claim 1, wherein the amount of overlapping among blocks is determined from an analysis of the image data.

7. The method of claim 6, wherein the analysis is performed according to the biomechanical properties of organs represented in the deformable image and the fixed image.

8. The method of claim 1, wherein the amount of overlapping among blocks is determined by the regularization coefficient of the optimization cost functional.

9. The method of claim 1, wherein the partioning into blocks is performed according to an analysis of the image data.

10. The method of claim 1, wherein the partioning into blocks is performed according to an identification of tissue boundaries representing the deformable image.

* * * * *